(12) United States Patent
Kilner

(10) Patent No.: US 6,793,163 B1
(45) Date of Patent: Sep. 21, 2004

(54) PROCESS FOR RECYCLING POWDER COATING FINES

(76) Inventor: Ian Kilner, Triumph Trading Park, Vitesse Avenue, Speke Hall Road, Liverpool, L24 9GQ, Merseyside (GB)

( * ) Notice: Subject to any disclaimer, the term of this patent is extended or adjusted under 35 U.S.C. 154(b) by 0 days.

(21) Appl. No.: 09/787,499

(22) PCT Filed: Sep. 15, 1999

(86) PCT No.: PCT/GB99/03072
§ 371 (c)(1),
(2), (4) Date: Jun. 4, 2001

(87) PCT Pub. No.: WO00/15705
PCT Pub. Date: Mar. 23, 2000

(30) Foreign Application Priority Data

Sep. 16, 1998 (GB) ............................................. 9820089

(51) Int. Cl.[7] ............................................. B02C 19/12
(52) U.S. Cl. ......................... 241/3; 264/37.29; 241/23
(58) Field of Search .................... 425/324.1; 264/37.29, 264/37.32; 241/3, 23, 25, 65

(56) References Cited

U.S. PATENT DOCUMENTS 3,752,631 A * 8/1973 Corbett et al. ........... 425/324.1
3,883,624 A * 5/1975 McKenzie et al. ....... 264/37.32
6,635,207 B1 * 10/2003 Graewe ...................... 264/117

FOREIGN PATENT DOCUMENTS

EP 0683199 A 11/1995
WO WO 98/33848 8/1998

* cited by examiner

*Primary Examiner*—Mark Rosenbaum
(74) *Attorney, Agent, or Firm*—Drinker Biddle & Reath LLP

(57) ABSTRACT

The present invention provides a process for recycling fines produced during the production of powder coatings comprising the steps of heating the fines for a sufficient time and a sufficient temperature such that a reusable product is obtained, cooling such product, crushing the cooled product to produce particles of a desired particle size; and removing any particles which are not of desired particle size.

12 Claims, 1 Drawing Sheet

PROCESS FOR RECYCLING POWDER COATING FINES

The present invention relates to a recycling process. In particular, the present invention relates to a recycling process that reclaims the fines produced during the manufacture of powder coatings, such that the fines can be reused in powder coatings. Additionally, the present invention provides a processing plant for carrying out such recycling process.

As an alternative to using traditional liquid paints, powder coatings are sprayed onto everyday items, for example, fridges, ovens, filing cabinets etc.

Powder coatings adhere to the metal substrate of the item that is sprayed, by electrostatic attraction. The painted or coated item is then heated in an oven, or cured by, for example, infra-red radiation. This produces the appropriate chemical reaction that provides the metal substrate with its finished surface.

Additionally, and by the use of NIR technology (Near Infra-Red), substrates such as wood or plastic can also be painted or coated using powder coating technology.

Regardless of the method of curing or heating utilised, in order to ensure an optimal adhesion of the powder coating to the substrate of the item being coated, a homogeneous temperature through the whole powder, substrate and boundary layer is required.

Generally, such powder coatings are manufactured by mixing the raw materials together, for example, resins, curing agents, fillers, pigments etc, and then extruding same into a continuous sheet by the application of heat and pressure. On cooling the resultant sheet, same is broken up into rough chips, which are then milled to produce a powder coating with a very specific particle size. The milling process is air fed to convey the product, as well as to take away the particles that are too small to meet the particular size specification. These small particles, which are commonly referred to in the industry as "fines", and are referred to throughout this application as "fines", are then collected on filters prior to being discharged into containers.

Although it is known to melt the fines into blocks and use the resulting blocks as an insulating material in building construction, as well as to use the fines as a filler or extender in battery casings, presently, the bulk of these collected fines are disposed of via landfill, which is not only costly, but is a waste of valuable raw materials and is environmentally unsound.

The reasons why such fines are mostly disposed of are that there are many problems associated with handling such fines. In particular:
1) Due to the extremely low bulk density of the fines, they occupy a large volume for storage, that is, given their very little mass;
2) Due to the physical nature of such fines, they are very difficult to handle and behave more like a liquid than a powder. Consequently, and due to their physical nature, they are not compatible with traditional powder handling techniques, or equipment for batch metering, blending or extrusion; and
3) Powder coating fines are by definition a "dust" and as a result thereof, they can easily be collected and contained as parts of a milling extraction plant. However, any attempt to re-utilise the collected fines as a raw material utilising standard equipment and technology, will energise the particles in such way as to have them extracted once again into the process dust collection system, or flow out, of any containing hoppers, thus defying any standard network operations.

Therefore, there is a need to provide a recycling process that converts the fines from a dust to a grain that is easier to handle. In particular, there is the need to provide a recycling process which can move the powder coatings industry towards a zero waste option.

In an attempt to devise such a process, we attempted a number of processes.

One of such processes involved processing the fines through a high pressure roll compactor. The roll pressure was varied from 5 to 100 bar and the screw feed was varied from minimum to maximum. It was observed that no compaction of the fines occurred and as a result thereof, it was concluded that such a method was not viable.

In a further attempt to provide a suitable process, the fines were placed in a high shear mixing vessel and heated via a steam jacket. The mixing blades and side refiner speeds were varied, together with the temperature. This resulted in the fines fusing into a solid block that almost destroyed the mixing vessel drive mechanism. In an attempt to overcome the observed problem, namely, the fines fusing into a solid block, several other attempts were made to cool down the mass, once the initial fusion temperature had been reached; however, all attempts in this regard failed, and no useful granulated material was produced. Once again, it was concluded that such a process was not viable.

With a view to trying to establish a more accurate profile of the fusion process, several experiments were undertaken in a laboratory oven. These involved placing 300 g of fines onto a tray and then subjecting the fines to different temperatures, for different durations of time. Such an approach was adopted with a view to narrowing down the range at which the fines would start to fuse. On doing so, it was observed that if the temperature and duration parameters were too low, no meaningful product could be produced, and if too high, the fines fused into solid block and hence, were unusable.

With reference to Table 1 below, the results of such experiments can be seen:

| Duration | Temperature | % Product[1] |
| --- | --- | --- |
| 1 hour | 70° C. | 58% |
| 2 hours | 70° C. | 83% |

[1]The % Product column indicates final yield of granular material once the semi-fused mass was crushed and screened through a 3.0 mm screen and then sieved on a 212 micron screen to remove any fines.

It was observed that the resulting grains were easy to handle and could be readily used as either a finished, non-colour specific, powder coating, that is, once the grains had been crushed to the correct particle size, or as a raw material for use in producing a new, colour specific, powder coating. With reference to the latter use, the resulting grains are preferably added at an addition level of around 5% to the new, colour specific, powder coating.

In light of our findings it is believed that in order to make the fines reusable and more manageable, it is essential to heat the fines to a point where they become tacky or semi-fused i.e. up to a point where the fines are not fully melted or cross-linked. If over-heated, the coating is fully cured and cannot be reused as a powder coating.

EP06-83199 discloses a process in which a layer of fines is formed on a conveyor belt and subjected to heat up to coalescence of the powder by below decomposition or cross-linking.

According to the present invention there is provided a process for recycling fines produced during the production of powder coatings comprising the steps of:

depositing the fines onto conveyor means as a series of continuous lines;

heating the lines of fines without fully melting or cross-linking them until they become sufficiently tacky to form agglomerated masses;

cooling such agglomerated masses; and collecting the agglomerated mass.

The invention further provides a process plant for recycling fines in accordance with a process for recycling fines the process plant including:

means for transporting the fines to be recycled as a series of continuous lines into a heating area and then into a cooling area.

It is an object of the present invention to provide a recycling process that enables the fines produced during the production of powder coatings to be reused as a powder coating.

The process of the invention preferably comprises the step of passing the fines under a profiled comb or plate to form the continuous lines. The lines preferably have triangular profiles and preferably have a depth of 0.5 to 1.0 cm.

Further preferably, the fines are heated at a temperature of 60–80° C., preferably 70° C.

Further preferably the resulting particles have a size of 3 mm to 212 microns.

Further preferably, any particles having a size of less than 212 microns are removed from the resultant product.

One example or a recycling process will now be described with reference to production trial that was carried out by us, and which is described herein below.

Production trial:

Several tons of fines were processed in a steam heated tray oven. The trays were lined with Melinex (RTM), which is a high melting point plastic film that will prevent adhesion or coating of the trays.

After a period of two hours, at a temperature of 70° C., it was observed that the mass on the trays had transformed into a crude honeycomb of product. This product was removed from the oven and allowed to cool on the trays.

The cooled mass was then removed from the trays and placed in a feed hopper to a crushing and screening plant. The particle size of the resulting grains produced was in the range of 3.00 mm to 212 microns.

The resulting, grains were then reprocessed as a new raw material component in some test formulations at an Inclusion rate of around 5%. The resulting test powder coatings were sprayed and baked in the normal QC process and found to be satisfactory.

Non-limiting embodiments of a processing plant in accordance with the present invention will now be described by way of example and with reference to the accompanying drawings, in which.

A first embodiment of a processing plant 10 in accordance with the present invention may include:

A) Fines Feed Hopper 11

The fines to be recycled were fed into a fines feed hopper 11. Preferably, the fines feed hopper 11 is designed so as to ensure that the fines do not block the hopper 11 thereby giving a variable or a zero feed rate. In this connection, in order to avoid the fines from bridging, rat-holing or generally not flowing evenly through the fines feed hopper 11, the fines feed hopper 11 is provided with a pneumatic vibrator 12 and bottom agitator 12a. It is to be understood that other standard free flow hoppers designed to ensure even flow of the fines therethrough would also be suitable.

B) Continuous Ribbed Moving Belt 14

Figure 1:
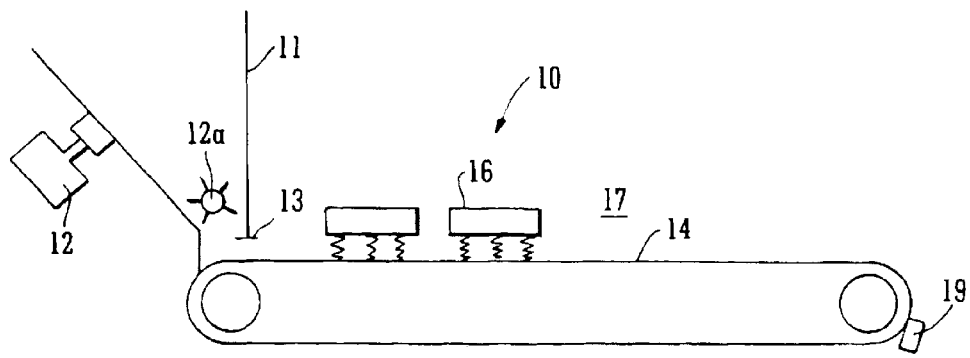
FIG. 1 is a schematic Illustration of a first embodiment of a process plant in accordance with the present invention.
Figure 2:
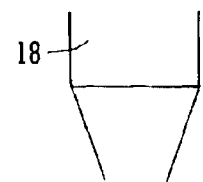
FIG. 2 is a side elevation of the belt of the plant of FIG. 1.

The bottom portion of the fines feed hopper 11 feeds directly on to a continuously moving belt 14. At the exit point of the fines feed hopper 11, a profiled plate or comb 13 is provided, which has the effect of feeding or depositing the fines 15 onto the belt 14 as a series of continuous lines, that is, as opposed to a flat bed of powder (see FIG. 2).

It is to be understood that by interchanging the comb 13, the profile of the lines of fines 15 deposited onto the belt 14 may be varied in shape and a depth. A typical profile of a line of fines 15 deposited onto the belt 14 may be triangular in shape having a depth of 0.5 cm–1 cm.

The belt 14 is preferably constructed from a heat resistant polymer, for example, a silicone rubber and additionally, is preferably smooth enough so that same can be easily cleaned. Furthermore, the surface of the belt 14 is preferably non-stick, such that the processed product is readily removable therefrom.

C) Curing Tunnel

The belt 14 transports the fines 15 into and through a curing tunnel at a rate that is preferably optimised to give the minimum amount of partial cross linking required to achieve the granule hardness and final spray characteristics that are required.

Preferably, the curing tunnel is heated by infra-red lamps 16, which heat the fines 15 being carried by the belt 14 from above. It is to be understood that in certain applications ultra violet radiation can be used as a suitable heat source.

The amount of heat or curing energy transferred to the fines 15, which are being transported by the belt 14, is dependent on the speed at which the belt 14 passes through the curing tunnel, as well as on the distance of the heat source, for example, the infra-red lamps 16, above the belt 14.

The skilled person will realise that once a partial cure profile is established for a particular grade of fines, the processing plant control settings can simply be set to those parameters for the treatment of the next batch of fines of that particular grade.

For a single lamp of around 1 KW, set at about 5 cm above the belt 14, the belt speed would run at such a rate to give the fines 15 an exposure time of around 1–5 seconds.

D) Cooling Section

Once the fines 15 have been appropriately part cured to the required parameters, the agglomerated lines of fines are transported by the belt 14 through a cooling stage. Given the small, low line profile of the lines of agglomerated fines, which will cool quite rapidly, cooling of the lines of agglomerated lines can be achieved by running the belt 14 through a cooling chamber 17, or simply, by exposing the agglomerated lines of fines to the open air.

The cooled agglomerated lines of product fall off the end of the belt 14 into a container, or directly into the extruder feed hopper 18

Unlike the batch oven produced material, which produces a large honeycomb of partially cured product, which needs to go through a crushing and screening process, the agglomerated material produced by this continuous process is directly reusable at the extruder stage of powder paint production.

A final scraper blade 19 cleans the belt 14 and the scrapings fall into the receiving container or extruder feed hopper 18.

Figure 3:
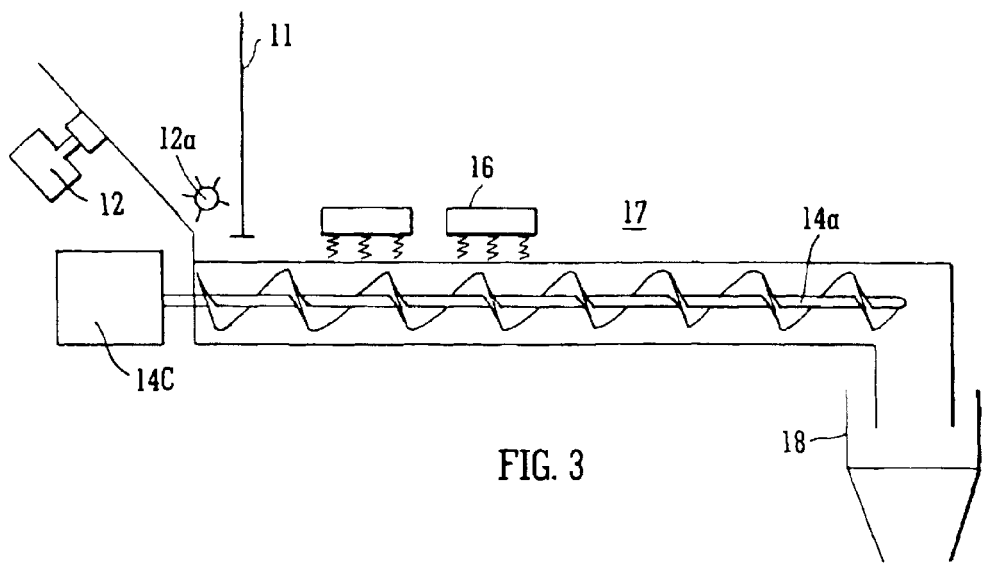
FIG. 3 is a schematic illustration of a second embodiment of a process plant in accordance with the present invention.

As illustrated in FIG. 3, in a processing plant suitable for carrying out the recycling process of the present invention, the continuously moving belt is replaced by a screw feed unit 14a, that is, the fines feed hopper 11 feeds the fines 15 to be recycled into a screw feed unit 14a that is driven by motor 14c.

The design of the hopper, hopper/screw feed interface and screw profile of the screw fed unit 14a are specifically designed to ensure a constant and controlled flow of fines through the system. Moreover, the materials of construction of the screw feed unit 14a ensure that part cured fines do not coat the plant interior, which facilitates cleaning of the plant.

The principle of a plant including a screw feed unit 14a is similar to the belt plant described above, in that the heating and curing energy is provided by infra-red lamps; although, it is to be understood that in certain applications ultra violet lamps may be used instead. Additionally, and although the screw feed unit replaces the belt conveying system, the heating and cooling stages work to the same principles.

The possible advantages of a plant incorporating a screw feed unit 14a may be that the fines being recycled are continually mixed or turned over by the action of the screw feed auger, which enables the radiation provided by the heat source to be more efficiently distributed throughout the total mass of fines being recycled.

Both the above plants have been designed to run continuously, as opposed to a batch oven process. They have also been designed to give a heat energy exposure time to achieve the minimal cross link format of a few seconds, as opposed to several hours in a conventional oven. With both of the continuous process plants described above, the physical characteristic of the recycled fines differs from the granules produced in the batch oven process.

As the additional granulating and screening processes have been eliminated, the recycled product has a more varied particle size distribution. Also, as the processes are tuned to achieve the minimum input of partial cure energy, the final recycled product is softer than an oven produced material.

However, on a production scale where the continuous process has been utilised, re-work inclusion rate of 50–100% have been achieved compared with 5% on the batch oven process. As a result thereof, if the plants are retro-fitted to existing extrusion lines, a closed loop can be achieved from the fines cyclone or discharge point on the mill directly to the extruder feed hopper, thus, achieving very close to 100% recovery of all fines generated.

Although the recycling process of the present invention has been described by way of example to the fines being processed in a batch tray oven, or a moving conveyor belt and in a screw feed chamber, it is to be understood that the process could also be carried out in any other heating or curing apparatus which could achieve the partial cure profile as described herein.

What is claimed is:

1. A process for recycling fines produced during the production of powder coatings comprising the steps of:
   depositing the fines onto conveyor means as a series of continuous lines;
   heating the lines of fines without fully melting or cross-linking them until they become sufficiently tacky to form agglomerated masses;
   cooling such agglomerated masses; and
   collecting the agglomerated masses.

2. A process as claimed in claim 1, comprising passing the fines under a profiled comb or plate to form the continuous lines.

3. A process as claimed in claim 1, wherein the continuous lines of fines have triangular profiles.

4. A process as claimed in claim 1, wherein the lines of fines have a depth of 0.5 to 1.0 cm.

5. A process as claimed in claim 1, wherein heating is by means of at least one infra red lamp.

6. A process as claimed in claim 1, wherein the conveyor means is a moving belt running at a speed to give the fines an exposure time of 1 to 5 seconds.

7. A process as claimed in claim 1, further comprising the step of processing the lines of agglomerated mass to produce particles of a desired particle size.

8. A process as claimed in claim 1, wherein the fines are heated at a temperature of 60 to 80° C.

9. A process as claimed in claim 8, wherein the fines are heated at a temperature of 70° C.

10. A process as claimed in claim 1, wherein after cooling, the cooled lines of agglomerated mass are crushed to produce particles of a desired particle size.

11. A process as claimed in claim 10, wherein the cooled lines of agglomerated mass are crushed to produce particles having a size of 3.00 mm to 212 microns.

12. A process as claimed in claim 11, wherein any crushed particles having a size of less than 212 microns are removed.

* * * * *